United States Patent [19]

Lennon

[11] 3,975,635

[45] Aug. 17, 1976

[54] XERORADIOGRAPHIC PLATE

[75] Inventor: John H. Lennon, Rochester, N.Y.

[73] Assignee: Xerox Corporation, Stamford, Conn.

[22] Filed: Jan. 24, 1975

[21] Appl. No.: 543,796

[52] U.S. Cl. .......... 250/315 A; 96/1 PC

[51] Int. Cl.[2] .......... G03B 41/16

[58] Field of Search .......... 250/315 A; 252/501; 96/1 PC

[56] References Cited

UNITED STATES PATENTS

| | | | |
|---|---|---|---|
| 3,484,237 | 12/1969 | Shattuck | 252/501 |
| 3,712,810 | 1/1973 | Ciuffini | 252/501 |

*Primary Examiner*—Craig E. Church

[57] ABSTRACT

An improved xeroradiographic plate has a conductive backing member, an overlying layer of selenium and an intermediate layer of polyvinyl carbazole or an alloy of arsenic and selenium.

6 Claims, 2 Drawing Figures

XERORADIOGRAPHIC PLATE

Figure 1:
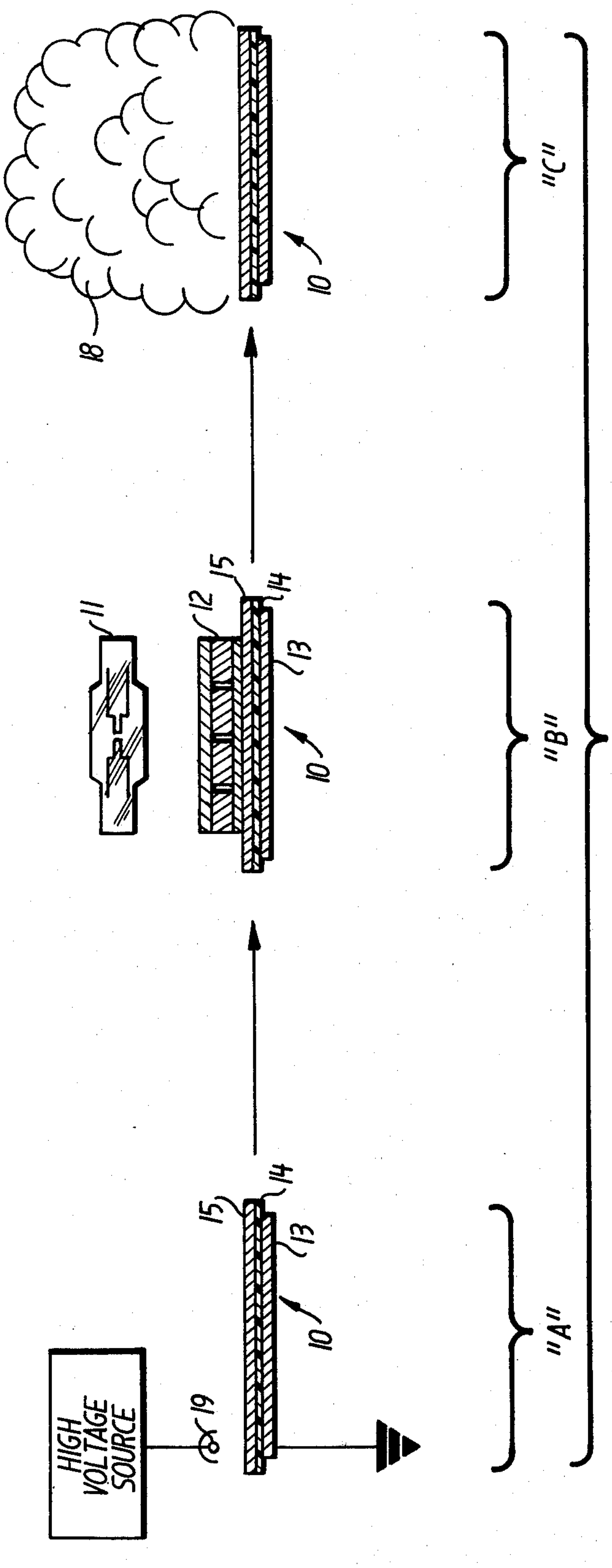

This invention relates generally to xeroradiography and more particularly to a method and apparatus for improving the resolution of the image produced by xeroradiography.

It has been proposed heretofore to form electrostatic images by electroradiography or xeroradiography in, for example, U.S. Pat. Nos. 2,666,144; 2,711,481 and 2,859,350. In accordance with the disclosed process, a plate composed of a conductive backing member and a layer of a material which is a good electrical insulator in the absence of radiation but having a lower electrical resistance in areas where radiation is absorbed or effects the material because of action of released carriers is sensitized by placing on its surface a uniform electrostatic charge. A latent image composed of electrostatic charges is created on the sensitized plate by projecting X-rays or similar penetrating radiation through an object and onto the plate surface. The resulting latent image may be viewed or otherwise used as such or it may be developed by spreading a developing powder electrostatically charged opposite in sign to the charge on the image pattern on the surface of the plate. The powder will be attracted only to the areas of the latent image and may be transferred to a paper sheet or the like and fused thereon to form a permanent print having the configuration of the latent image. In accordance with the prior art the sensitized plate for use in xeroradiography may have a conductive backing member such as aluminum, brass, stainless steel or other metal, tin oxide coated glass or the like and a photoconductive insulating surface layer of anthracene, sulfur, selenium or mixtures thereof. It has also been proposed in U.S. Pat. Nos. 3,037,861 and 3,484,237 to substitute a sensitized polyvinyl carbazole layer for a selenium or other photoconductive layer on a sensitized plate used in xerography but such plates have not been accepted extensively in xeroradiography because even with the addition of a sensitizer the polyvinyl carbazole photoconductive composition is much slower than selenium and there is a tendency for the dark conductivity of the plate to become so high that the photoconductive composition will no longer accept sufficient electrostatic charge to be useful in xeroradiography.

It has been found in xerography that images on a relatively thick photoreceptor are capable of development at lower fields than those on thinner photoreceptors. However, when such plates are used in xeroradiography there is a loss in resolution.

It is therefore an object of this invention to provide an improved method and apparatus for forming electrostatic latent images by xeroradiography which are devoid of the foregoing disadvantages. Another object of the invention is to provide a new and improved xeroradiographic method and apparatus which produce improved results. A more specific object of the invention is to provide a new and improved xeroradiographic plate on which a latent image can be produced which can be developed at relatively low fields and has greater contrast and higher resolution than those produced by the heretofore available plates having a relatively thick photoconductive layer. A still more specific object of the invention is to improve the resolution of images produced by xeroradiographic methods.

Figure 2:
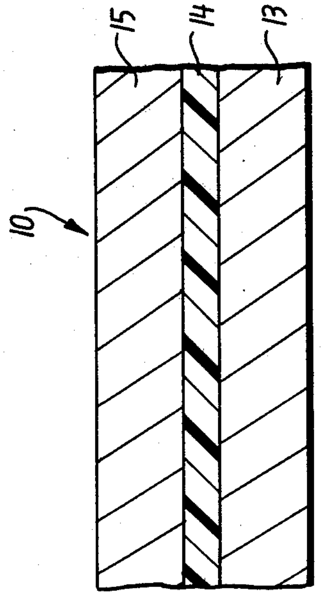

Other objects will become apparent from the following description with reference to the accompanying drawing wherein FIG. 1 illustrates diagrammatically an embodiment of a process for making a radiograph by xeroradiography in accordance with this invention; and FIG. 2 illustrates in cross-section an embodiment of the xeroradiographic plate provided by the invention.

The foregoing objects and others are accomplished in accordance with this invention, generally speaking, by providing a xeroradiographic plate having an electrical conductive backing member, a relatively thick amorphous selenium surface layer and an intermediate layer of polyvinyl carbazole (PVK) or an alloy of arsenic and selenium interposed between the selenium layer and conductive backing member. Preferably, the arsenic-selenium alloy consists essentially of from about 15 to about 45% by weight arsenic and 85 to 55% selenium. The thickness of the selenium layer may be from about 120 to 400 microns while the thickness of the intermediate layer may vary from about 15 to about 150 microns depending upon the thickness of the selenium layer. The PVK and arsenic-selenium alloy layers are conductive to positive charging and conduct generated carriers but are capable of conducting only one carrier and/or relatively insensitive to X-ray radiation. It is believed that the intermediate layer reduces the capacitance of the structure with the result that images are obtained which are capable of development at lower fields without substantial loss of resolution. The invention thus contemplates in its broader aspects a sensitive plate adapted for use in xeroradiography which has a relatively thick photoconductive layer of PVK or arsenic-selenium alloy of a thickness which will reduce the capacitance of the photoconductor to a point where improved resolution is obtained.

Referring now to the drawing, a xeroradiography method is illustrated diagrammatically in FIG. 1 in three stages A, B and C. At stage A, a plate member 10 (illustrated in FIG. 2) having a tin oxide coated glass backing member 13, an adherent intermediate layer 14 of PVK about 15 microns thick and an adherent surface layer 15 of vitrous selenium about 120 microns thick is charged by a conventional corona discharge electrode 19 which supplies a uniform electrostatic charge to surface layer 15. As illustrated at stage B, an object 12 to be examined is placed on sensitized plate 10 under X-ray source 11. Penetrating radiation from source 11 penetrates object 12 and exposes sensitized plate 10 to create on the photoreceptive insulating layer 15 an electrostatic latent image of the radiograph of object 12.

The exposed plate 10 is then developed by a conventional development method at stage C. The plate member 10 may be exposed to finely divided charged material such as cloud 18 of powder developer particles or the image may be developed in accordance with any other suitable method. For example, the cascading development method described in U.S. Pat. No. ,2,297,691 or the liquid development method of U.S. Pat. No. 2,618,552 may be used.

In a second embodiment of the invention, an intermediate layer of an alloy of about 30% arsenic and 70% selenium (by weight is substituted for the PVK layer of the embodiment illustrated in FIGS. 1 and 2.

The plate provided by this invention may have a relatively thick layer 15 of a material which becomes conductive when exposed to X-rays and which in the absence of penetrating radiation is a good insulator such as vitrous selenium having suitable resistivities in the presence of and in the absence of penetrating radiation, an intermediate layer 14 of PVK or arsenic-selenium alloy and a conductive backing member 13 of aluminum, brass, tin oxide coated glass or the like.

The plate 10 may be prepared by conventional methods. Backing member 13 should first be cleaned and polished. The coating of PVK or arsenic-selenium alloy may be then applied uniformly over the surface of the backing member and a layer of selenium deposited thereover in an evacuated vessel as described in the art such as in U.S. Pat. No. 2,901,349. The relative thickness of selenium to PVK or arsenic-selenium alloy layers is preferably from about 3:1 to about 8:1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What I claim is:

1. A xeroradiographic plate consisting essentially of a conductive backing having thereon a photoconductive layer of selenium and an intermediate layer selected from the group consisting of polyvinyl carbazole and an alloy of from about 15 to about 45% by weight of arsenic and from about 55 to about 85% by weight of selenium.

2. The plate of claim 1 wherein the thickness of the selenium layer is from about 120 to about 400 microns.

3. The plate of claim 2 wherein the thickness of the intermediate layer is from about 15 to about 150 microns.

4. The plate of claim 3 wherein the intermediate layer is polyvinyl carbazole.

5. A method of improving the resolution of an image pattern on an electrostatically charged surface consisting essentially of selenium overlying a conductive backing member which comprises interposing a layer selected from the group consisting of polyvinyl carbazole and an alloy of from about 15 to about 45% by weight of arsenic and from about 55 to about 85% by weight of selenium between the backing member and said surface.

6. A method of forming a radiograhic latent image pattern of electrostatic charges on a plate comprising placing a uniform electrostatic charge on the surface of a selenium layer overlying a conductive backing member and an intermediate layer selected from the group consisting of polyvinyl carbazole and an alloy of from about 15 to about 45% by weight of arsenic and from about 55 to about 85% by weight of selenium, supporting an object to be radiographed between the plate and a source of X-rays and exposing the plate to a source of X-rays.

* * * * *

UNITED STATES PATENT AND TRADEMARK OFFICE
CERTIFICATE OF CORRECTION

PATENT NO. : 3,975,635

DATED : August 17, 1976

INVENTOR(S) : John H. Lennon

It is certified that error appears in the above-identified patent and that said Letters Patent are hereby corrected as shown below:

Column 2, line 43, delete "vitrous" and insert --vitreous--.

Column 2, line 60, delete ",2,297,691" and insert --2,297,691--.

Column 2, line 64 after "weight", insert a closing parenthesis -- ) --.

Column 3, line 2, delete "vitrous" and insert --vitreous--.

Signed and Sealed this

Ninth Day of November 1976

[SEAL]

*Attest:*

RUTH C. MASON
*Attesting Officer*

C. MARSHALL DANN
*Commissioner of Patents and Trademarks*